United States Patent [19]
Rosenberger et al.

[11] 3,884,874
[45] May 20, 1975

[54] DIACYL-HYDRAZINE STABILIZERS FOR POLYOLEFINS

[75] Inventors: Siegfried Rosenberger, Riehen; Andreas Schmidt, Reinach, both of Switzerland

[73] Assignee: Ciba-Geigy Corporation, Ardsley, N.Y.

[22] Filed: Nov. 16, 1972

[21] Appl. No.: 307,269

[30] Foreign Application Priority Data
Nov. 26, 1971  Switzerland................ 17241/71

[52] U.S. Cl.............. 260/45.85 B; 260/45.85 S; 260/45.9 NC; 260/45.9 NN; 260/45.95 R; 260/558 H; 260/559 H
[51] Int. Cl. .............................................. C08f 45/60
[58] Field of Search.... 260/45.9 NC, 558 H, 559 H, 260/45.85, 45.95

[56] References Cited
UNITED STATES PATENTS

| | | | |
|---|---|---|---|
| 2,808,416 | 10/1957 | Bell et al. | 260/45.9 NC |
| 3,022,268 | 2/1962 | Armitage et al. | 260/45.9 NC |
| 3,034,879 | 5/1962 | Spacht | 260/45.9 NC |
| 3,660,438 | 5/1972 | Dexter | 260/45.9 NC |
| 3,773,830 | 11/1973 | Dexter | 260/45.9 NC |

*Primary Examiner*—V. P. Hoke
*Attorney, Agent, or Firm*—Nestor W. Shust; Luther A. R. Hall

[57] ABSTRACT

Disclosed are process for stabilising polyolefines with compounds of formula 1, use of compounds of formula 1 for stabilising polyolefines and stabilising compositions, comprising;
a. a polyolefine; and
b. compounds of the formula $$R_1-CO-NHNH-CO-R_2 \qquad (1)$$

in which $R_1$ and $R_2$ independently of one another denote the unsubstituted phenyl group, a phenyl group substituted by a hydroxyl group in the m- or p-position, by one or two alkyl groups each with 1 to 4 carbon atoms, by one or two alkenyl groups each with 3 or 4 carbon atoms by one or two cycloalkyl groups each with 6 to 8 carbon atoms, by one or two chlorine atoms, by one or two alkoxy groups each with 1 to 18 carbon atoms, by one or two acyloxy groups each with 2 to 18 carbon atoms, by an acylamino group with 2 to 18 carbon atoms or by an amino group in the o-position, or a pyridyl radical or in which, if $R_1$ denotes a substituted phenyl group, $R_2$ also denotes hydrogen, alkyl with 1 to 18 carbon atoms, cyclohexyl or benzyl.

Also disclosed is a process for the manufacture of novel compounds of the formula 1, in which $R_1$ and $R_2$ independently of one another denote phenyl groups which are substituted in the m- or p- position by a hydroxyl group or one or 2 alkoxy groups with 1 to 18 carbon atoms, and in which $R_2$ also denotes an alkyl group with 1 to 18 carbon atoms, cyclohexyl, benzyl or phenyl.

13 Claims, No Drawings

DIACYL-HYDRAZINE STABILIZERS FOR POLYOLEFINS

The subject of the present invention are new diacyl-hydrazines and their use for stabilising polyolefines.

Because of their physical and electrical properties polyolefines, especially polypropylene, are very suitable for use as an insulating material in the electrical industry, especially for coating copper wires, cables and other electrically conducting materials made of copper. Unfortunately, however, the said good properties of the polyolefines deteriorate because in contact with transition metals, especially with copper and its compounds, the polyolefines undergo an oxidative degradation catalysed by these metals. Additions of copper of less than 1 percent for example already lead to the stability of polypropylene to oxidation being reduced by a factor of ~100.

Various different acylation products of hydrazine have already been disclosed for stabilising polyolefines against the harmful action of transition metals, such as, for example, alkylated, cycloalkylated, arylated or acetylated derivatives of salicylic acid hydrazide; dihydrazides of various dicarboxylic acids, and also acylation products of hydrazine with acids containing sulphur.

All these compounds show certain technical disadvantages. On the one hand, their activity is insufficient completely to suppress the harmful action of the transition metal. On the other hand, they objectionably discolour the polyolefine either already whilst being incorporated or under thermo-oxidative aging conditions. The latter disadvantage, in particular, manifests itself in the case of other classes of active dicarboxylic acid dihydrazide derivatives which have been disclosed, namely in the case of the bis-arylidenedicarboxylic acid dihydrazides, in the case of the bis-alkylhydroxyphenylalkanoyl-hydrazines and in the case of the bis-alkylhydroxybenzoyl-hydrazines. Whilst these display a satisfactory deactivating action, they are in themselves already yellow-coloured compounds. None of the types of compound hitherto disclosed combines in itself the technically desired optimum stabilising action with absence of colour under use conditions.

It has now been found that the compounds of the formula I

$$R_1-CO-NHNH-CO-R_2 \qquad (I)$$

in which $R_1$ and $R_2$ independently of one another denote the unsubstituted phenyl group, a phenyl group substituted by a hydroxyl group in the m- or p-position, by one or two alkyl groups each with 1 to 4 carbon atoms, by one or two alkenyl groups each with 3 or 4 carbon atoms, by one or two cycloalkyl groups each with 6 to 8 carbon atoms, by one or two chlorine atoms, by one or two alkoxy groups each with 1 to 18 carbon atoms, by one or two acyloxy groups each with 2 to 18 carbon atoms, by an acylamino group with 2 to 18 carbon atoms or by an amino group in the o-position, or a pyridyl radical or in which, if $R_1$ denotes a substituted phenyl group, $R_2$ also denotes hydrogen, alkyl with 1 to 18 carbon atoms, cyclohexyl or benzyl, are, surprisingly, very suitable for stabilising homopolymeric or copolymeric polyolefines against thermo-oxidative degradation and at the same time possess good colour properties.

The compounds of the formula I in particular protect homopolymeric and copolymeric polyolefines against thermooxidative degradation in the presence of transition metals.

The compounds of the formula I are not only excellent stabilisers but furthermore have the advantage of being colourless. This makes it possible to incorporate them into polyolefines without objectionably discolouring the latter. All the abovementioned previously known compounds have the property of having a discolouring effect in polyolefines under aging conditions, whilst the compounds according to the invention cause practically no discolourations under these conditions, which represents a great technical advantage for long-term stabilisation.

If $R_1$ and $R_2$ are phenyl groups substituted by alkyl groups with 1 to 4 carbon atoms each, the alkyl groups can be methyl, ethyl, propyl, iso-propyl, butyl, sec. butyl or tert. butyl. As alkenyl-substituted phenyl groups, $R_1$ and $R_2$ can, for example, be allylphenyl or butenylphenyl. If the substituents of the phenyl groups $R_1$ and $R_2$ are cyclohexyl groups each with 6 to 8 carbon atoms, these substituents can be cyclohexyl, α-methylcyclohexyl or cyclooctyl. If $R_1$ and $R_2$ denote phenyl groups substituted by alkoxy groups each with 1 to 8 carbon atoms, the alkoxy groups can be methoxy, ethoxy, propoxy, iso-propoxy, butoxy, sec.-butoxy, tert.-butoxy, pentoxy, tert.-pentoxy, sec.-pentoxy, hexoxy, iso-heptoxy, octoxy or 1,1,3,3-tetramethylbutoxy, undecyloxy, dodecyloxy, hexadecyloxy or octadecyloxy. $R_1$ and $R_2$ can also be phenyl radicals substituted by acyloxy or acylamino groups, each with 2 to 18 carbon atoms, in which case "acyl" can be, for example, the acyl radical of the following acids: acetic acid, propionic acid, butyric acid, isobutyric acid, valeric acid, caproic acid, 2-ethylcaproic acid, caprylic acid, capric acid, lauric acid, myristic acid, palmitic acid, stearic acid, benzoic acid or phenylacetic acid. The preferred acyl radical is the radical of the benzoic acid. If $R_1$ denotes a substituted phenyl group, $R_2$ can also be an alkyl group with 1 to 18 carbon atoms such as methyl, ethyl, propyl, butyl, pentyl, hexyl, iso-heptyl, octyl, nonyl, undecyl, dodecyl, tetradecyl, hexadecyl or octadecyl.

The preferred compounds of the formula I are those in which $R_1$ and $R_2$ independently of one another denote a phenyl group which is substituted by a hydroxyl group in the m- or p-position, by one or two alkoxy groups each with 1 to 18, and particularly preferentially 1 to 16, carbon atoms, by an acylamino group with 2 to 7 carbon atoms or by an amino group in the o-position, or in which, if $R_1$ represents an acylaminophenyl group with 2 to 7 carbon atoms in the acyl radical, $R_2$ also denotes alkyl with 1 to 8 carbon atoms and particularly preferentially methyl, benzyl or phenyl.

Compounds of the formula I in which $R_1$ and $R_2$ independently of one another denote phenyl groups which are substituted in the m- or p-position by a hydroxyl group or one or 2 alkoxy groups with 1 to 18, preferably 1 to 16, carbon atoms, and in which $R_2$ also denotes an alkyl group with 1 to 18 carbon atoms, cyclohexyl, benzyl or phenyl, are new.

The following are examples of compounds of the formula I which display particularly good stabilising properties: N,N'-bis-(3,5-dimethoxybenzoyl)-hydrazine, N,N'-bis-(4-octyloxybenzoyl)-hydrazine, N-(4-benzoylaminobenzoyl)-N'-benzoyl-hydrazine, N-(4-acetylaminobenzoyl)-N'-acetylhydrazine and N,N'-bis-(2-aminobenzoyl)-hydrazine.

The compounds of the formula I provide protection against degradation for polyolefines, preferably α-olefinepolymers, such as polypropylene, optionally crosslinked polyethylene, polyisobutylene, polymethylbutene-1, polymethylpentene-1, polybutene-1, polyisoprene and polybutadiene; copolymers of the monomers on which the homopolymers mentioned are based, such as ethylene-propylene copolymers, propylene-butene-1 copolymers, propylene-isobutylene copolymers, styrene-butadiene copolymers and terpolymers of ethylene and propylene with a diene, such as, for example, hexadiene, dicyclopentadiene or ethylidenenorbornene; mixtures of the abovementioned homopolymers such as, for example, mixtures of polypropylene and polyethylene, polypropylene and poly-butene-1, and polypropylene and polyisobutylene. Polypropylene and its mixtures, and the copolymers which contain propylene units, are preferred.

The compounds of the formula I are incorporated into the substrates in a concentration of 0.01 to 5 percent by weight relative to the material to be stabilised.

Preferably, 0.05 to 1.5, and particularly preferably 0.1 to 0.8, percent by weight of the compounds, calculated relative to the material to be stabilised, are incorporated into the latter. The incorporation can be effected after polymerisation, for example by mixing at least one of the compounds of the formula I and optionally further additives into the melt in accordance with the methods usual in the art, before or during shaping, or by applying the dissolved or dispersed compounds to the polymer, if necessary with subsequent evaporation of the solvent.

In the case of crosslinked polyethylene, the compounds are added before crosslinking.

As further additives together with which the stabilisers usable according to the invention can be employed, there should be mentioned:

1. Anti-oxidants of the aminoaryl and hydroxyaryl series. Amongst the latter, the sterically hindered phenol compounds should be mentioned, for example: 2,2'-thiobis-(4-methyl-6-tert.butylphenol), 4,4'-thiobis-(3-methyl-6-tert.butylphenol), 2,2'-methylene-bis-(4-methyl-6-tert.butylphenol), 2,2'-methylene-bis-(4-ethyl-6-tert.butylphenol), 4,4'-methylene-bis-(2-methyl-6-tert.butylphenol), 4,4'-butylidene-bis-(3-methyl-6-tert.butylphenol), 2,2'-methylene-bis-[4-methyl-6-(α-methylcyclohexyl)-phenol], 2,6-di-(2-hydroxy-3-tert.butyl-5-methylbenzyl)-4-methylphenol, 2,6-di-tert.butyl-4-methylphenol, 1,1,3-tris-(2-methyl-4-hydroxy-5-tert.butyl-phenyl)-butane, 1,3,5-trimethyl-2,4,6-tri-(3,5-di-tert.butyl-4-hydroxybenzyl)-benzene, esters of β-4-hydroxy-3,5-di-tert.butylphenyl-propionic acid with monohydric or polyhydric alcohols, such as methanol, ethanol, octadecanol, hexanediol, nonanediol, thiodiethylene glycol, trimethylolethane or pentaerythritol, or tris-hydroxyethylisocyanurate, 2,4-bis-octylmercapto-6-(4-hydroxy-3,5-di-tert.butylanilino)-s-triazine, 2,4-bis-(4-hydroxy-3,5-di-tert.butylphenoxy)-6-octylmercapto-s-triazine, 1,1-bis-(4-hydroxy-2-methyl-5-tert.butyl-phenyl)-3-dodecyl-mercapto-butane, 4-hydroxy-3,5-di-tert.butylbenzyl-phosphonic acid esters, such as the dimethyl, diethyl or dioctadecyl ester, (3-methyl-4-hydroxy-5-tert.butylbenzyl)-malonic acid dioctadecyl ester, S-(3,5-dimethyl-4-hydroxyphenyl)-thioglycollic acid octadecyl ester, esters of bis-(3,5-di-tert.butyl-4-hydroxybenzyl)-malonic acid, such as the didodecyl ester, the dioctadecyl ester and the 2-dodecylmercaptoethyl ester, 4-hydroxymethyl-1-phospha-2,6,7-trioxabicyclo-[2,2,2]-octane-3-(3,5-ditert.butyl-4-hydroxyphenyl)-propionate, 1,3,5-tris-(3,5-ditert.butyl-4-hydroxybenzyl)-isocyanurate and 1,3,5-tris'-(3-[3,5-ditert.butyl-4-hydroxyphenyl]-propionyl)-hexahydro-s-triazine.

Amongst the aminoaryl derivatives there should be mentioned aniline and naphthylamine derivatives as well as their heterocyclic derivatives, for example: phenyl-1-naphthylamine, phenyl-2-naphthylamine, N,N'diphenyl-p-phenylenediamine, N,N'-di-2-naphthyl-p-phenylenediamine, N,N'-di-sec.butyl-p-phenylenediamine, 6-ethoxy-2,2,4-trimethyl-1,2-dihydroquinoline, 6-dodecyl-2,2,4-trimethyl-1,2-hydroquinoline, mono- and di-octyliminodibenzyl and polymerised 2,2,4-trimethyl-1,2-dihydroquinoline, though in the case of the combined use of the compounds of the formula I with the abovementioned amine compounds the stabilised polymer no longer has such good colour properties, because of the tendency to discolouration of the amine compounds.

2. UV-absorbers and light protection agents such as:
a. 2-(2'Hydroxyphenyl)-benztriazoles, for example the 5'-methyl-; 3',5'-di-tert.butyl-; 5'-tert.butyl-; 5-chloro-3'; 5'-di-tert.butyl-; 5-chloro-3'-tert.butyl-5'-methyl-; 3',5'-di-tert.amyl-; 3'-methyl-5'-β-methoxycarbonylethyl-; and 5-chloro-3',5'-di-tert.amyl-derivative.

b. 2,4-Bis-(2'-hydroxyphenyl)-6-alkyl-s-triazines, for example the 6-ethyl- or 6-undecyl-derivative.

c. 2-Hydroxy-benzophenones, for example the 4-hydroxy-, 4-methoxy-, 4-octoxy-, 4-decyloxy-, 4-dodecyloxy-4,2',4'tri-hydroxy- or 2'-hydroxy-4,4'-dimethoxy derivative.

d. 1,3-Bis-(2'-hydroxy-benzoyl)-benzenes, for example 1,3-bis-(2'-hydroxy-4'-hexyloxy-benzoyl)-benzene, 1,3-bis-(2'-hydroxy-4'-octoxy-benzoyl)-benzene and 1,3-bis-(2'-hydroxy-4'-dodecyloxy-benzoyl)-benzene.

e. Aryl esters of optionally substituted benzoic acids such as, for example, phenyl salicylate, octylphenyl salicylate, benzoylresorcinol, dibenzoylresorcinol, 3,5-di-tert.butyl-4-hydroxybenzoic acid 2,4-di-tert.butyl-phenyl ester or octadecyl ester.

f. Acrylates, for example α-cyano-β,β,-diphenylacrylic acid ethyl ester or isooctyl ester, α-carbomethoxycinnamic acid methyl ester, α-cyano-β-methyl-p-methoxy-cinnamic acid methyl ester or butyl ester and N-(β-carbomethoxyvinyl)-2-methylindoline.

g. Nickel compounds, for example nickel complexes of bis-[2-hydroxy-5-(1',1',3',3'-tetramethylbutyl)-phenyl]sulphide, such as the 1:1- and 1:2-complex, optionally with other ligands such as n-butylamine; nickel complexes of bis-[2-hydroxy-5-(1',1',3',3'-tetramethylbutyl)phenyl]sulphone, such as the 2:1-complex, optionally with other ligands such as 2-ethylcaproic acid; nickel dibutyldithiocarbamate, nickel salts or 4-hydroxy-3,5-di-tert.butylbenzylphosphonic acid monoalkyl esters, such as the methyl, ethyl or butyl ester, and the nickel complex of 2-hydroxy-4-methyl-phenyl-undecylketonoxime.

h. Oxalic acid diamides, for example 4,4'-dioctyloxyoxanilide, 2,2'-di-octyloxy-5,5'-di-tert.butyloxanilide and 2,2'-di-dodecyloxy-5,5'-di-tert.butyloxanilide.

3. Phosphites, such as triphenylphosphite, diphenylalkylphosphites, phenyldialkylphosphites, trionylphenylphosphite, trilaurylphosphite, trioctadecylphosphite, 3,9-di-isodecyloxy-2,4,8,10-tetraoxa-3,9-diphosphaspiro-(5,5)-undecane and tri-(4-hydroxy-3,5-di-tert.butylphenyl)-phosphite.

4. Nucleating agents, such as 4-tert.butylbenzoic acid, adipic acid and diphenylacetic acid.

5. Compounds which destroy peroxides, such as esters of β-thiodipropionic acid, for example the lauryl, stearyl, myristyl or tridecyl ester. Salts of 2-mercaptobenzimidazole, for example the zinc salt, and diphenylthiourea.

6. Other additives such as plasticisers, anti-static agents, dyeing auxiliaries, flameproofing agents, pigments, carbon black, asbestos, glass fibres, kaolin, talc and blowing agents.

When using the stabilisers according to the invention in combination with phenolic anti-oxidants, particularly good stabilising effects are achieved if at the same time compounds which destroy peroxides, such as higher alkyl esters of thiodipropionic acid, are employed, since these compounds which destroy peroxides not only show synergism, as is known, with the phenolic anti-oxidants, but also show synergism with the stabilisers of the formula I.

The compounds of the formula I can above all be manufactured by two reaction paths which are in themselves known:

a. Reaction of 2 mols of a substituted benzoic acid chloride with one mol of hydrazine, whilst adding 2 mols of alkali hydroxide. This reaction path yields symmetrical substituted dibenzoyl hydrazines.

b. Reaction of a monocarboxylic acid hydrazide with a reactive derivative of a monocarboxylic acid, that is to say a monocarboxylic acid chloride or a monocarboxylic acid anhydride. In some case, monocarboxylic acid esters can also be used.

The polyolefines stabilised by addition of the compounds according to the invention are, in particular, suitable for use as coating materials of copper wires and cables, but also for other types of metal coating and for the manufacture of shaped articles, such as films, filaments, sheets, pipes, injection moulding articles and the like. They can also be used mixed with copper or with pigments containing copper.

The invention is explained in more detail in the examples which follow.

EXAMPLE 1

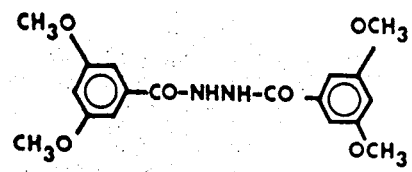

12 g (0.3 mol) of sodium hydroxide and 7.5 g (0.15 mol) of hydrazine hydrate are initially introduced into 350 ml of water. The solution is treated dropwise, at room temperature, with 60 g (0.3 mol) of 3,5-dimethoxybenzoyl chloride. When the slightly exothermic reaction has subsided, the mixture is stirred for a further 12 hours. The product is filtered off and recrystallised from methanol. The N,N'-bis-(3,5-dimethoxybenzoyl)-hydrazine thus obtained (Stabiliser No.1) has a melting point of 194°C.

If in this example the 3,5-dimethoxylbenzoyl chloride is replaced by an equimolecular amount of one of the benzoic acid chlorides of Table 1 which follows, and otherwise the same procedure is employed, the N,N'-dibenzoylhydrazines having the indicated melting points are obtained.

Table 1

| Formula of the benzoic acid chloride | Melting point of the N,N'-dibenzoylhydrazine in °C | Recrystallised from |
|---|---|---|
| $C_{16}H_{33}O$—⟨O⟩—COCl | 87° (Stabiliser No.2) | Acetone |
| $C_{16}H_{33}O$, $C_8H_{17}O$—⟨O⟩—COCl | 157-158° (Stabiliser No.3) | Ethylene glycol monomethyl ether |
| $C_{16}H_{33}O$—⟨O⟩—COCl | 158° (Stabiliser No.4) | " |
| $CH_3COO$—⟨O⟩—COCl | 265° (Stabiliser No.5) | " |
| $CH_3CONH$—⟨O⟩—COCl | 333-338° (Stabiliser No.6) | Glacial acetic acid/water |
| ⟨O⟩—COCl | 237° (Stabiliser No.7) | Ethylene glycol monomethyl ether |

EXAMPLE 2

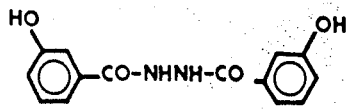

15.2 g (0.1 mol) of 3-hydroxybenzoic acid methyl ester and 15.2 g (0.1 mol) of 3-hydroxybenzoic acid hydrazide together with 500 mg of lithium amide are fused at 150°–160°C. After a short time, the reaction mixture again solidifies. After 1 hour, 10 ml of tetralin are added and the mixture is stirred for a further hour at 160°C. After cooling, 200 ml of methanol are added and the mixture is briefly stirred up and the product is filtered off. For purification, the product is dissolved in a little dimethylformamide and reprecipitated with alcohol. N,N'-Bis-(3-hydroxybenzoyl)-hydrazine (Stabiliser No.8) of melting point 319°C is thus obtained.

If in this example the 3-hydroxybenzoic acid methyl ester and the 3-hydroxybenzoic acid hydrazide are replaced by equimolecular amounts of 4-tert.butylbenzoic acid methyl ester and 4-tert.butylbenzoic acid hydrazide, and otherwise an analogous procedure is followed, N,N'-bis-(4-tert.butylbenzoyl)-hydrazine (Stabiliser No.9) of melting point 285°C is obtained.

If in this example the 3-hydroxybenzoic acid methyl ester and the 3-hydroxybenzoic acid hydrazide are replaced by equimolecular amounts of 4-hydroxybenzoic acid methyl ester or 4-hydroxybenzoic acid hydrazide and otherwise the same procedure is followed, N,N'-bis-(4-hydroxybenzoyl)-hydrazine of melting point above 300°C is obtained.

EXAMPLE 3

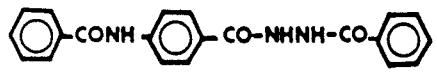

12.1 g (0.08 mol) of 4-aminobenzhydrazide are dissolved in 60 ml of dimethylacetamide. A solution of 22.5 g (0.16 mol) of benzoyl chloride in 20 ml of dioxane is added dropwise to this solution at room temperature. The reaction takes place with evolution of heat. Thereafter the mixture is kept for 2 hours at 90°C, cooled and poured into 500 ml of water, whereupon the reaction product precipitates. The substance is filtered off, washed with alcohol and purified by recrystallisation from ethylene glycol monomethyl ether. The N-(4-benzoylaminobenzoyl)-N'-benzoyl-hydrazine thus obtained (Stabiliser No.10) melts at 264°C.

If in this example the benzoyl chloride is replaced by an equivalent amount of acetyl chloride or acetic anhydride and otherwise an analogous procedure is followed, N-(4-acetylaminobenzoyl)-N'-acetyl-hydrazine (Stabiliser No.11) is obtained, which after crystallisation from 90 percent strength alcohol melts at 286°C.

If the 4-aminobenzhydrazide is replaced by an equivalent amount of 2-aminobenzhydrazide and the reaction is carried out analogously with benzoyl chloride, N-(2-benzoylaminobenzoyl)-N'-benzoyl-hydrazine (Stabiliser No.12) of melting point 238°C is obtained.

EXAMPLE 4

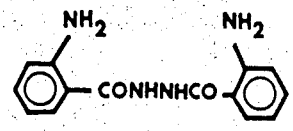

16.3 g (0.1 mol) of isatoic anhydride are warmed to 70°C with 50 ml of dry chlorobenzene. 2.5 g (0.05 mol) of hydrazine hydrate are added dropwise to the mixture over the course of 10 minutes and the whole is then warmed to 110°C for 15 hours. After cooling the product is filtered off, washed with ligroin and repeatedly recrystallised from glacial acetic acid. N,N'-Bis-(2-aminobenzoyl)-hydrazine (Stabiliser No. 13) of melting point 207°C is thus obtained.

EXAMPLE 5

7.1 g (0.05 mol) of cyclohexanecarboxylic acid hydrazide are dissolved in 70 ml of dimethylacetamide at 50°C. A solution of 8.8 g (0.05 mol) of 3-chlorobenzoyl chloride in 50 ml of dimethylacetamide is slowly added dropwise at this temperature. Thereafter the yellow solution is mixed with 5.0 g of triethylamine and stirred for 1 hour at 50°C. After cooling, the mixture is poured into 1 litre of water and the product which has precipitated is filtered off and dried at 100°C. After recrystallisation from methylcellosolve, the N-(3-chlorobenzoyl)-N'-cyclohexanoyl-hydrazine thus obtained (Stabiliser No.14) shows a melting point of above 240°C.

EXAMPLE 6

13.7 g (0.1 mol) of picolinic acid hydrazide are dissolved in 150 ml of dimethylacetamide. The yellow solution is mixed dropwise with a solution of 15.5 g (0.11 mol) of picolinic acid chloride in 60 ml of dimethylacetamide. The mixture turns almost black. After stirring for 1 hour at 60°C, it is poured into 1 litre of water, the resulting acid suspension is neutralised with sodium carbonate and the product is filtered off. After drying, it is repeatedly recrystallised from ethylene glycol monomethyl ether. The N,N'-dipicoloyl-hydrazine thus obtained (Stabiliser No.15) melts at 218°C.

The previously known metal deactivators for polyolefines listed in Table 2 which follows were also tested as comparison compounds in the test examples which follow.

Table 2

| Stabiliser No. | Chemical Name |
|---|---|
| 16 | N,N'-Bis-(12-thia-tetracosanoyl)-hydrazine |
| 17 | Oxalic acid dihydrazide |
| 18 | Carbohydrazide |
| 19 | Malonic acid dihydrazide |
| 20 | Adipic acid dihydrazide |
| 21 | Terephthalic acid dihydrazide |
| 22 | Isophthalic acid dihydrazide |
| 23 | Succinic acid bis-phenylhydrazide |
| 24 | Sebacic acid bis-phenylhydrazide |
| 25 | Salicylic acid hydrazide |
| 26 | N-Acetyl-N'salicyloyl-hydrazine |
| 27 | N-Salicyloyl-N'-salicylal-hydrazine |

EXAMPLE 7 a. Manufacture of the test specimens 100 parts by weight of polypropylene (melt index 3.2 g/10 minutes, 230°C/2,160 g) are thoroughly mixed for 10 minutes, in a shaking apparatus, with 0.1 part by weight of 3-(3,5-di-tert.butyl-4-hydroxy-phenyl)-propionic acid octadecyl ester, 0.3 part by weight of dilauryl thiodipropionate and 0.5 part by weight of one of the additives listed in Table 3 below.

The resulting mixture is kneaded for 10 minutes in a Brabender plastograph at 200°C, then mixed with 1.0 percent by weight of powdered copper (manufactured electrolytically, Merck) and thoroughly mixed for a further 2 minutes at the same temperature. The mass thus obtained is subsequently pressed in a sheet press at 260°C platen temperature to give 1 mm thick sheets from which strips 1 cm wide and 17 cm long are punched.

The heat-stabilised test specimens without added copper, or with added copper but without metal deactivator, which are required for comparison purposes, are manufactured analogously.

b. Test

The test of the activity of the metal deactivators added to the test strips containing copper is effected by heat aging in a circulating air oven at 149°C and the result is compared with test strips not containing copper. For this purpose, 3 test strips of each formulation are employed. The end point is defined as the incipient easily visible decomposition of the test strip.

Table 3

| Stabiliser No. | Days until decomposition starts | |
|---|---|---|
| | without copper | with copper |
| without additive | 18 – 27 | 1 |
| 1 | 25 | 18 |
| 3 | 58 | 10 |
| 8 | 19 | 7 |
| 10 | 22 | 18 |
| 11 | 19 | 14 |
| 13 | 21 | 17 |
| 15 | 23 | 16 |
| Comparison products | | |
| 16 | 54 | 1 |
| 17 | 24 | 6 |
| 20 | 18 | 2 |
| 21 | 25 | 2 |
| 23 | 21 | 1 |
| 24 | 25 | 24 |
| 25 | 27 | 8 |
| 26 | 20 | 4 |
| 27 | 19 | 16 |

EXAMPLE 8 a. Manufacture of the test specimens 100 parts by weight of polypropylene (melt index 3.2 g/10 minutes, 230°C/2,160 g) are thoroughly mixed for 10 minutes, in a shaking apparatus, with 0.1 part by weight of 3-(3,5-di-tert.butyl-4-hydroxy-phenyl)-propionic acid octadecyl ester, 0.3 part by weight of dilauryl thiodipropionate and 0.5 part by weight of one of the additives listed in Table 4 below.

The resulting mixture is kneaded for 10 minutes in a Brabender plastograph at 200°C, then mixed with 1.0 percent by weight of powdered copper (manufactured electrolytically, Merck) and thoroughly mixed for a further 2 minutes at the same temperature. The mass thus obtained is subsequently pressed in a sheet press at 260°C platen temperature to give 1 mm thick sheets from which strips 1 cm wide and 17 cm long are punched by means of a punch tool.

The heat-stabilised test specimens without added copper, or with added copper but without metal deactivator, which are required for comparison purposes, are manufactured analogously.

b. Test

The test of the activity of the metal deactivators added to the test strips containing copper is effected by heat aging in a circulating air oven at 135°C and the result is compared with test strips not containing copper. For this purpose, 3 test strips of each formulation are employed. The end point is defined as the incipient easily visible decomposition of the test strip.

Table 4

| Stabiliser No. | Days until decomposition starts | |
|---|---|---|
| | without copper | with copper |
| without additive | 70 – 95 | 1 |
| 1 | 102 | 71 |
| 3 | 148 | 70 |
| 5 | 106 | 29 |
| 7 | 92 | 13 |
| 9 | 80 | 13 |
| 10 | 76 | 67 |
| 11 | 81 | 67 |
| 13 | 110 | 82 |
| 14 | 100 | 56 |
| 15 | 90 | 58 |
| Comparison products | | |
| 16 | 200 | 2 |
| 18 | 76 | 13 |
| 19 | 72 | 1 |
| 21 | 88 | 4 |
| 25 | 90 | 24 |
| 26 | 90 | 27 |
| 27 | 86 | 72 |

EXAMPLE 9

The test specimens without added copper, described in Example 7, are additionally tested for their colour stability, namely:

a. after incorporation (Table 5, Column 2)
b. after heat aging at 149°C (Table 5, Column 3)
c. after treating for 1 week with boiling water (Table 5, Column 4).

An empirical colour scale was used for the table, in which 5 denotes absence of colour
4 denotes a just perceptible slight discolouration and
3,2,1,<1 denote progressively stronger discolouration.

Table 5

Test for Colour Stability (without added copper)

| Stabiliser No. | Colour Assessment according to scale 1 – 5 | | |
|---|---|---|---|
| | after incorporation | after heat aging at 149°C | boiling water, 1 week |
| without additive | 5 | 4 | 4 |
| 1 | 4 | 2 | 4 |
| 3 | 4 | 2 | 4 |
| 8 | 4 | 2 | 3–4 |
| 10 | 4 | 2 | 4–5 |
| 11 | 4 | 2 | 4 |
| 13 | 4 | 1 | 4 |
| 15 | 3 | 1 | 3 |
| Comparison Products | | | |
| 16 | 4–5 | <1 | 1 |
| 17 | 1 | <1 | 2 |
| 20 | <1 | <1 | <1 |
| 21 | 3–4 | <1 | 2 |
| 23 | 3–4 | <1 | 2–3 |
| 24 | <1 | <1 | <1 |
| 25 | 1 | 1 | <1 |
| 26 | 1 | 2 | <1 |
| 27 | 1 | <1 | 2 |

EXAMPLE 10

100 parts by weight of polypropylene (melt index 3.2 g/10 minutes, 230°C/2,160 g) are thoroughly mixed for 10 minutes, in a shaking apparatus, with the additives listed in Table 6, in the indicated concentrations.

The resulting mixture is kneaded for 10 minutes in a Brabender plastograph at 200°C, then 0.1 percent by weight of copper stearate is added and the whole is thoroughly mixed at the same temperature for a further 2 minutes. The mass thus obtained is subsequently pressed in a sheet press at 260°C platen temperature to give 1 mm thick sheets from which strips 1 cm wide and 17 cm long are punched by means of a punch tool.

The fully stabilised test specimens without added copper stearate, required for comparison purposes, are manufactured analogously.

The activity of the metal deactivator (stabiliser No. 10) in the test strips containing copper stearate is tested by heat aging in a circulating air oven at 149°C. For results, see Table 6, column 4. The oven aging times of the test specimens without added copper stearate, required for comparison, are given in Table 6, column 3.

Table 6

| Mixture | Additives and Concentrate | Days to Incipient Decomposition | |
|---|---|---|---|
| | | without Cu stearate | with Cu stearate |
| 1 | 0.1 part*) of Additive A<br>0.3 part*) of Additive B<br>without metal deactivator | 27 | 1 |
| 2 | 0.1 part*) of Additive A<br>0.3 part*) of Additive B<br>0.5 part*) of Stabiliser No. 10 | 25 | 18 |

*)parts by weight calculated relative to the unstabilised polypropylene.

Additives Used:
A: 1,1,3-Tris-(3'-tert.-butyl-4'-hydroxy-6'-methylphenyl)-butane
B: Dilaurylthiodipropionate

EXAMPLE 11

100 parts by weight of polypropylene (melt index 3.2 g/10 minutes, 230°C/2,160 g) are thoroughly mixed in a shaking apparatus with 0.1 part by weight of 3-(3',5'-di-tert.-butyl-4'-hydroxyphenyl)-propionic acid octadecyl ester, 0.3 part by weight of dilaurylthiodipropionate and one of the additives listed in Table 7 below, in the indicated amount.

The resulting mixture is kneaded for 10 minutes in a Brabender plastograph at 200°C, then mixed with 1.0 percent by weight of powdered copper (manufactured electrolytically, Merck) and thoroughly mixed for a further 2 minutes at the same temperature. The resulting mass is subsequently pressed in a sheet press at 260°C platen temperature to give 1 mm thick sheets from which strips 1 cm wide and 17 cm long are punched with the aid of a punch tool.

The test of the activity of the metal deactivators added to the test strips, as a function of the concentration, is carried out by heat aging in a circulating air oven at 149°C. The results are indicated in Table 7.

Table 7

(Days to Incipient Decomposition)

| Stabiliser No. | Amount of Admixed Stabiliser | | |
|---|---|---|---|
| | 0 part*) | 0.2 part*) | 0.5 part*) |
| 1 | <1 | 13 | 18 |
| 10 | <1 | 11 | 18 |
| 11 | <1 | 9 | 14 |
| 13 | <1 | 13 | 17 |
| 15 | <1 | 13 | 16 |

*)parts by weight calculated relative to the unstabilised polypropylene.

EXAMPLE 12

100 parts by weight of polypropylene (melt index 3.2 g/10 minutes, 230°C/2,160 g) are thoroughly mixed for 10 minutes in a shaking apparatus with 0.1 part by weight of one of the additives listed in Table 8 below and 0.3 part by weight of dilaurylthiodipropionate.

The resulting mixture is kneaded for 10 minutes in a Brabender plastograph at 200°C and the mass thus obtained is subsequently pressed in a sheet press at 260°C platen temperature to give 1 mm thick sheets from which strips 1 cm wide and 17 cm long are punched.

The test of the activity of the additives added to the test strips, as regards their property as synergistically acting antioxidants in the presence of dilaurylthiodipropionate, is carried out by heat aging in a circulating air oven at 135°C and 149°C, with an additive-free test strip serving for comparison. For this test, 3 test strips of each formulation are employed. The incipient easily visible decomposition of the test strip is defined as the end point; the results are indicated in days.

Table 8

| Stabiliser No. | Days to Incipient Decomposition | |
|---|---|---|
| | 135°C | 149°C |
| without additive | 22 | 9 |
| 2 | 50 | 18 |
| 3 | 65 | 19 |
| 4 | 71 | 24 |
| Comparison Products | | |
| 17 | 22 | 8 |
| 18 | 26 | 11 |
| 21 | 30 | 11 |
| 25 | 22 | 10 |

EXAMPLE 13

100 parts by weight of polypropylene (melt index 3.2 g/10 minutes, 230°C/2,160 g) are thoroughly mixed for 10 minutes in a shaking apparatus with 0.1 part by weight of 3-(3,5-di-tert.-butyl-4-hydroxyphenyl)-propionic acid octadecyl ester (Additive C), 0.3 part by weight of dilaurylthiodipropionate (Additive B) and 0.5 part by weight of an additive listed in Table 9 below.

The resulting mixture is kneaded for 10 minutes in a Brabender plastograph at 200°C and the mass thus obtained is subsequently pressed in a sheet press at 260°C platen temperature to give 1 mm thick sheets from which strips 1 cm wide and 17 cm long are punched.

The test of the activity of the additives added to the test strips, in respect of their property as synergistically acting antioxidants in the presence of additives C and B, is carried out by heat aging in a circulating air oven at 135°C and 149°C, a test strip which only contains the additives C and B serving as comparison. In these tests, 3 test strips of each formulation are employed. The end point is defined as the incipient easily visible decomposition of the test strip and the results are quoted in days.

Table 9

| Stabiliser No. | Days to Incipient Decomposition | |
|---|---|---|
| | 135°C | 149°C |
| without additive | 90 | 20 |
| 2 | 156 | 30 |
| 3 | 148 | 58 |
| 13 | 110 | 21 |
| 15 | 90 | 23 |
| Comparison Products | | |
| 20 | 92 | 17 |
| 26 | 90 | 20 |
| 27 | 86 | 19 |

EXAMPLE 14 a. Manufacture of the Test Specimens 100 parts by weight of unstabilised polybutene-1 in the form of a powder aare thoroughly mixed in a shaking apparatus with 0.1 part by weight of β-(3,5-di-tert.-butyl-4-hydroxyphenyl)-propionic acid octadecyl ester, 0.3 part by weight of dilaurylthiodipropionate and 0.5 part by weight of Stabiliser No. 10.

This mixture is plasticised and homogenised for 10 minutes in a Brabender plastograph at 200°C, at the end of this time 1 part by weight of powdered copper (manufactured electrolytically, Merck) is added and the whole is then mixed for a further 2 minutes at the same temperature. The resulting mass is pressed in a sheet press at 220°C platen temperature for 6 minutes to give 1 mm thick sheets and test strips 1 cm wide and 14 cm long are punched therefrom. The test specimens without added copper, required for comparison purposes, are manufactured analogously.

b. Test

The test of the activity of the metal deactivator added to the test specimens containing copper is carried out by heat aging in a circulating air oven at 110°C up to the first sign of incipient decomposition of the test specimen. 3 test specimens are employed for each formulation, and their oven lives are determined.

In these tests, the test specimens which contain Stabiliser 10 as yet show no sign of decomposition at a point in time where the unstabilised test specimens are already completely decomposed.

EXAMPLE 15

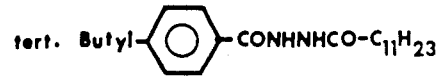

7.7 g (0.04 mol) of 4-tert.-butyl-benzoic acid hydrazide are dissolved in 60 ml of dimethylacetamide. A solution of 8.7 g (0.04 mol) of lauric acid chloride in 40 ml of dimethylacetamide is slowly added dropwise at room temperature. Thereafter 4.0 g of triethylamine are added to the solution and the mixture is stirred for 1 hour at 60°C. After cooling, the mixture is poured into 1 litre of water and the product which has precipitated is filtered off and directly recrystallised from ethanol. N-p-tert.butylbenzoyl-N'-benzoyl-hydrazine (Stabiliser No. 28) of melting point 100°C is thus obtained.

If, in this example, the lauric acid chloride is replaced by an equimolecular amount of stearic acid chloride and otherwise the same procedure is followed, N-p-tert.-butylbenzoyl-N'-stearoyl-hydrazine (Stabiliser No. 29) of melting point 106°C is obtained.

We claim:

1. A composition of matter stabilised against thermo-oxidative degradation and discoloration which comprises a polyolefin and
   a. from 0.01 to 5 percent by weight of a compound A of the formula $$R_1-CO-NHNH-CO-R_2$$

wherein
   $R_1$ and $R_2$ independently of one another denote the unsubstituted phenyl group, a phenyl group substituted by a hydroxyl group in the m- or p-position, by one or two alkyl groups each with 1 to 4 carbon atoms, by one or two alkenyl groups each with 3 or 4 carbon atoms, by one or two cycloalkyl groups with 6 to 8 carbon atoms, by 1 or 2 chlorine atoms, by one or two alkoxy groups each with 1 to 18 carbon atoms or by an acylamino group with 2 to 18 carbon atoms or by an amino group in the o-position, or where $R_2$ also denotes hydrogen, alkyl with 1 to 18 carbon atoms, cyclohexyl or benzyl if $R_1$ denotes a substituted phenyl group, and b. 0.3 percent by weight of an ester of β-thiodipropionic acid selected from the group consisting of dilauryl β-thiodipropionate and distearyl β-thiodipropionate.

2. A composition according to claim 1 containing compound A wherein $R_1$ and $R_2$ independently of one another denote a phenyl group substituted by a hydroxyl group in the m- or p-position, by one or two alkoxy groups each with 1 to 18 carbon atoms, by an acylamino group with 2 to 7 carbon atoms or by an amino group in the o-position, or where $R_2$ also denotes alkyl with 1 to 8 carbon atoms, benzyl or phenyl if $R_1$ represents an acylaminophenyl group with 2 to 7 carbon atoms in the acyl radical.

3. A composition according to claim 1 containing compound A wherein $R_1$ and $R_2$ independently of one another denote a phenyl group substituted by a hydroxyl group in the m- or p-position, by one or two alkoxy groups each with 1 to 16 carbon atoms, by an acylamino group with 2 to 7 atoms or by an amino group in the o-position, or where $R_2$ also denotes methyl or phenyl if $R_1$ represents an acylaminophenyl group with 2 to 7 carbon atoms in the acyl radical.

4. A composition according to claim 1 in which compound A is present in a concentration of from 0.05 to 1.5 percent by weight.

5. A composition according to claim 1 in which compound A is present in a concentration of from 0.1 to 0.8 percent by weight.

6. A composition according to claim 1 in which the polyolefin is polypropylene.

7. A composition according to claim 1 in which compound A is

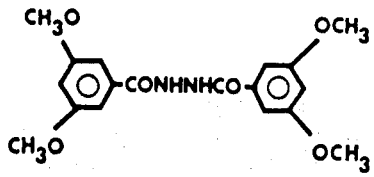

8. A composition according to claim 1 in which compound A is

9. A composition according to claim 1 in which compound A is

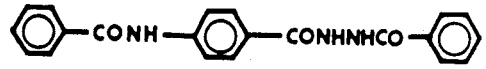

10. A composition according to claim 1 in which compouund A is

11. A composition according to claim 1 in which compound A is

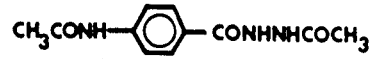

12. A composition according to claim 1 containing additionally from 0 to 0.1 percent by weight of a phenolic antioxidant.

13. A composition according to claim 12 containing a phenolic antioxidant selected from the group consisting of 3-(3,5-di-tert-butyl-4-hydroxyphenyl)propionic acid octadecyl ester and 1,1,3-tris(2-methyl-4-hydroxy-5-tert-butylphenyl)butane.

* * * * *